US008226223B2

(12) United States Patent
Shimada

(10) Patent No.: US 8,226,223 B2
(45) Date of Patent: Jul. 24, 2012

(54) INK SET FOR INK-JET RECORDING, INK-JET RECORDING APPARATUS, AND METHOD OF INK-JET RECORDING

(75) Inventor: Kou Shimada, Nagoya (JP)

(73) Assignee: Broker Kogyo Kabushiki Kaisha, Nagoya-shi, Aichi (JP)

( * ) Notice: Subject to any disclaimer, the term of this patent is extended or adjusted under 35 U.S.C. 154(b) by 782 days.

(21) Appl. No.: 12/365,198

(22) Filed: Feb. 4, 2009

(65) Prior Publication Data

US 2009/0195571 A1 Aug. 6, 2009

(30) Foreign Application Priority Data

Feb. 4, 2008 (JP) ................................ 2008-023513

(51) Int. Cl.
*C09D 11/00* (2006.01)

(52) U.S. Cl. ............... 347/96; 347/100; 347/95; 347/98; 106/31.36

(58) Field of Classification Search ............ 347/95–100; 106/31.36, 31.68; 523/160, 161
See application file for complete search history.

(56) References Cited

U.S. PATENT DOCUMENTS

| 5,900,899 | A | 5/1999 | Ichizawa et al. | |
|---|---|---|---|---|
| 6,050,680 | A * | 4/2000 | Moriyama et al. | 347/85 |
| 6,368,397 | B1 | 4/2002 | Ichizawa et al. | |
| 6,582,047 | B2 * | 6/2003 | Koitabashi et al. | 347/16 |
| 7,156,514 | B2 * | 1/2007 | Rosa | 347/100 |
| 2004/0259978 | A1 * | 12/2004 | Tani et al. | 523/160 |

FOREIGN PATENT DOCUMENTS

| JP | 09-316376 | 12/1997 |
|---|---|---|
| JP | 11-035860 | 2/1999 |
| JP | 2000-108495 | 4/2000 |
| JP | 2000-204305 | 7/2000 |
| JP | 2000-351931 | 12/2000 |
| JP | 2001-049154 | 2/2001 |
| JP | 2003-170610 | 6/2003 |
| JP | 2004-263105 | 9/2004 |

* cited by examiner

*Primary Examiner* — Matthew Luu
*Assistant Examiner* — Rut Patel
(74) *Attorney, Agent, or Firm* — Banner & Witcoff, Ltd.

(57) ABSTRACT

An ink set for ink-jet recording having a main ink and a sub ink. The main ink includes at least one of a polysaccharide and a polysaccharide derivative. The sub ink includes enzyme degrading at least one of the polysaccharide and the said polysaccharide derivative in the main ink.

10 Claims, 3 Drawing Sheets

INK SET FOR INK-JET RECORDING, INK-JET RECORDING APPARATUS, AND METHOD OF INK-JET RECORDING

CROSS-REFERENCE TO RELATED APPLICATION

This application claims priority from Japanese Patent Application No. 2008-023513 filed on Feb. 4, 2008. The entire subject matter of the Japanese Patent Application is incorporated herein by reference.

BACKGROUND

Conventionally, in order to prevent clogging of a nozzle of an ink-jet head and to adjust viscosity, polysaccharide or its derivative is blended to an ink for ink-jet recording. An ink-jet recording apparatus is normally used under a room temperature of 20° C. to 30° C. However, depending on location and season, the ink-jet recording apparatus may be used under a low temperature. In a case of under the low temperature, due to the polysaccharide and the like, an ink viscosity may be increased more than necessary. When the ink viscosity becomes too high, in the ink-jet recording apparatus, a problem, in which an appropriate amount of ink is not ejected, or a problem of unejection due to clogging of the nozzle may occur.

SUMMARY

An ink set for ink-jet recording comprises a main ink and a sub ink. The main ink comprises at least one of a polysaccharide and a polysaccharide derivative. The sub ink comprises enzyme degrading at least one of the polysaccharide and the polysaccharide derivative comprised in the main ink.

A full color ink set for ink-jet recording comprises a yellow ink set, a magenta ink set, and a cyan ink set. The yellow ink set is an ink set in which a coloring agent comprised in the main ink and the sub ink comprise a yellow coloring agent. The magenta ink set is an ink set in which the coloring agent comprised in the main ink and the sub ink comprise a magenta coloring agent. The cyan ink set is an ink set in which the coloring agent comprised in the main ink and the sub ink comprise a cyan coloring agent.

A method of ink-jet recording performs recording on a recording medium by ejecting an ink in an ink set. The ink set for ink-jet recording is used as the ink set. The method comprises a viscosity adjusting step of the main ink before ejecting the ink. In the viscosity adjusting step, in a case where a parameter relating to a viscosity of the main ink is out of a predetermined reference value, the sub ink is mixed to the main ink, and at least one of a polysaccharide and a polysaccharide derivative in the main ink is degraded by enzyme in the sub ink to reduce viscosity of the main ink.

An ink-jet recording apparatus performs recording on a recording medium by ejecting an ink in an ink set. The ink-jet recording apparatus comprises a main ink storing portion, a sub ink storing portion, an ink adjusting tank, an ink ejecting unit, and a viscosity adjusting unit. The ink adjusting tank is connected to the main ink storing portion, the sub ink storing portion, and the ink ejecting unit through flow passages, respectively. The main ink of the ink set for ink-jet recording is storable in the main ink storing portion. The sub ink of the ink set for ink-jet recording is storable in the sub ink storing portion. The viscosity adjusting unit is a unit for adjusting a viscosity of the main ink before ejection and comprises a temperature measuring unit and an ink amount controlling unit. In the viscosity adjusting unit, in a case where at least one of an atmosphere temperature and a main ink temperature measured by the temperature measuring unit is out of a predetermined reference value, the sub ink is mixed to the main ink in the ink adjusting tank by the ink amount controlling unit, and at least one of a polysaccharide and a polysaccharide derivative in the main ink is degraded by enzyme in the sub ink to reduce viscosity of the main ink.

DETAILED DESCRIPTION

Figure 1:
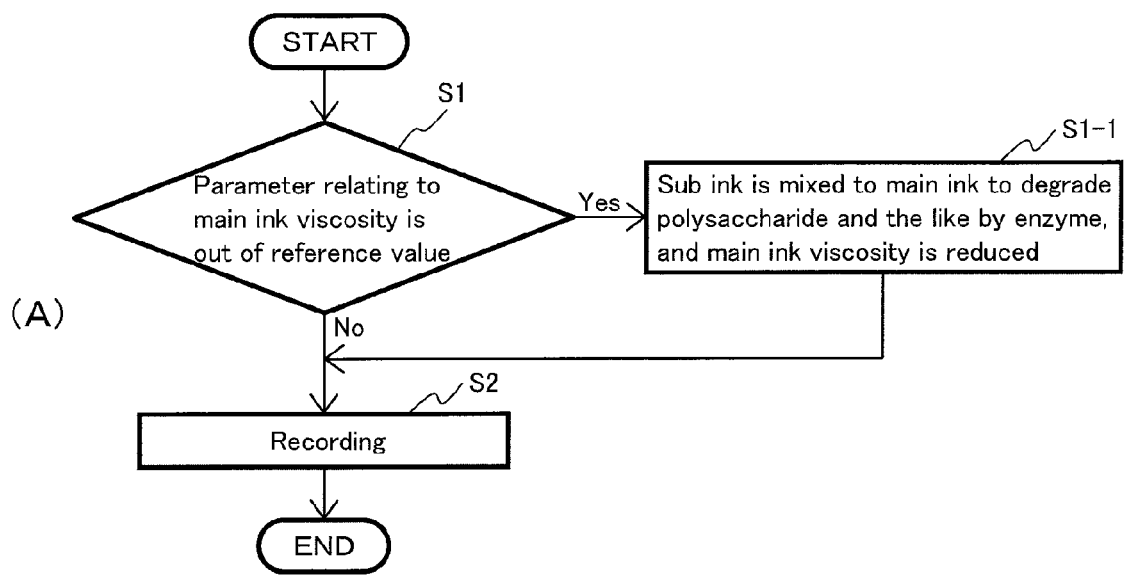
FIG. 1(A) is a flow chart of an example of the method of ink-jet recording.
FIG. 1(B) is a schematic block diagram showing an example of a structure of the ink-jet recording apparatus.
Figure 1:
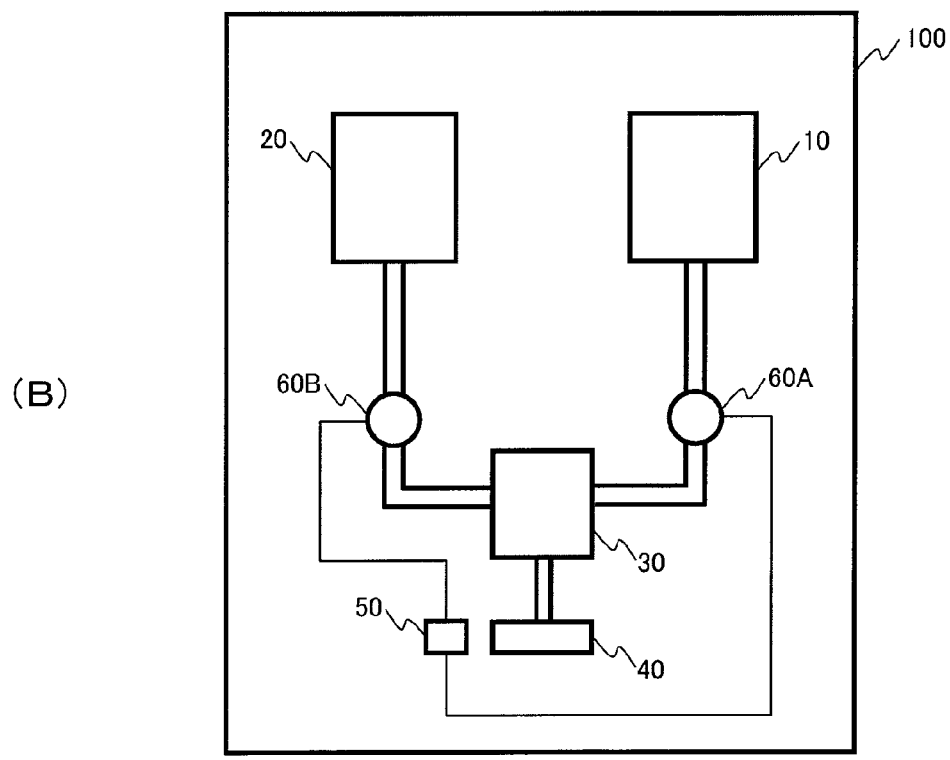

In the method of ink-jet recording, in the viscosity adjusting step, examples of a parameter relating to a main ink viscosity comprise a main ink viscosity itself, an atmosphere temperature, a main ink temperature, and the like, and the atmosphere temperature in the vicinity of an ink-jet head is preferable.

In the ink set for ink-jet recording, the method of ink-jet recording, and the ink-jet recording apparatus, the main ink and the sub ink each further may comprise a coloring agent, and a type and an amount of the coloring agent in the main ink are identical to that of the coloring agent in the sub ink. Thereby, even when the sub ink is mixed to the main ink, change in color tone is small and further good recording quality is obtained.

In the ink set for ink-jet recording, the method of ink-jet recording, and the inkjet recording apparatus, the main ink and the sub ink each further may comprise water, and a type and an amount of each component of the main ink except for the water and at least one of the polysaccharide and the polysaccharide derivative are identical to a type and an amount of each component of the sub ink except for the water and the enzyme. Thereby, various characteristic values (surface tension, pH, electrical conductivity, density, and the like) of the sub ink become approximate to that of the main ink. Therefore, in a case where the sub ink is mixed to the main ink, only viscosity is required to be considered and viscosity adjustment of the ink becomes easier.

In the ink set for ink-jet recording, the method of ink-jet recording, and the ink-jet recording apparatus, the full color ink set may be use.

In the full color ink set, the ink set further may comprise a black ink set, in which the coloring agent comprised in the main ink and the sub ink comprises a black coloring agent.

The ink set for ink-jet recording is explained. The ink set for ink-jet recording (hereinafter, also may simply be referred to as "ink set") comprises a main ink and a sub ink.

First, the main ink is explained. The main ink comprises at least one of a polysaccharide and a polysaccharide derivative (hereinafter, also may be referred to as "polysaccharide and the like"). Inclusion of the polysaccharide and the like to the main ink makes it possible to obtain suitable ink viscosity, to stabilize dispersion of a pigment, and to improve settlement of the ink. The polysaccharide is not particularly limited, and examples thereof include amylose, amylopectin, starch, agarose, pectin, xanthan gum, guar gum, alginic acid, locust bean gum, hyaluronan, chitin, heparin, condroitin, and the like. The polysaccharide derivative is not particularly limited, and examples thereof include hydroxypropyl guar gum, cationic guar gum, carboxymethylcellulose sodium, hydroxyethylcellulose, hydroxypropylcellulose, cationic cellulose, and the like. One of the polysaccharide and the like may be used alone or two more of them may be used in combination.

A ratio of the polysaccharide and the like relative to a total amount of the main ink (ratio of the polysaccharide and the like) may be a ratio in which suitable viscosity of the main ink can be obtained in a condition where an ink-jet recording apparatus is supposed to be used under a normal atmosphere temperature (for example, 20° C. to 30° C.). The ratio of the polysaccharide and the like is decided suitably according to types of the polysaccharide and the like, composition of the main ink, and the like. The ratio of the polysaccharide and the like is, for example, in the range of about 0.01 wt % to about 10 wt %, in the range of about 0.03 wt % to about 5 wt %, and in the range of about 0.05 wt % to about 3 wt %.

The main ink further may comprise a coloring agent. The coloring agent to be comprised in the main ink is not particularly limited, and may be any of a dye or a pigment. Further, as the coloring agent, a mixture of a dye and a pigment may be used.

The dye is not particularly limited and examples thereof include a direct dye, an acid dye, a basic dye, a reactive dye, and the like. Specific Examples of the dye include C. I. Direct Black, C. I. Direct Blue, C. I. Direct Red, C. I. Direct Yellow, C. I. Direct Orange, C. I. Direct Violet, C. I. Direct Brown, C. I. Direct Green, C. I. Acid Black, C. I. Acid Blue, C. I. Acid Red, C. I. Acid Yellow, C. I. Acid Orange, C. I. Acid Violet, C. I. Basic Black, C. I. Basic Blue, C. I. Basic Red, C. I. Basic Violet, C. I. Food Black, and the like. Examples of the C. I. Direct Black include C. I. Direct Black 17, 19, 32, 51, 71, 108, 146, 154, 168, and the like. Examples of the C. I. Direct Blue include C.I. Direct Blue 6, 22, 25, 71, 86, 90, 106, 199, and the like. Examples of the C. I. Direct Red include C. I. Direct Red 1, 4, 17, 28, 83, 227, and the like. Examples of the C. I. Direct Yellow include C. I. Direct Yellow 12, 24, 26, 86, 98, 132, 142, 173, and the like. Examples of the C. I. Direct Orange include C. I. Direct Orange 34, 39, 44, 46, 60, and the like. Examples of the C. I. Direct Violet include C. I. Direct Violet 47, 48, and the like. Examples of the C. I. Direct Brown include C. I. Direct Brown 109, and the like. Examples of the C. I. Direct Green include C. I. Direct Green 59, and the like. Examples of the C. I. Acid Black include C. I. Acid Black 2, 7, 24, 26, 31, 52, 63, 112, 118, and the like. Examples of the C. I. Acid Blue include C. I. Acid Blue 9, 22, 40, 59, 93, 102, 104, 117, 120, 167, 229, 234, and the like. Examples of the C. I. Acid Red include C. I. Acid Red 1, 6, 32, 37, 51, 52, 80, 85, 87, 92, 94, 115, 180, 256, 289, 315, 317, and the like. Examples of the C. I. Acid Yellow include C. I. Acid Yellow 11, 17, 23, 25, 29, 42, 61, 71, and the like. Examples of the C. I. Acid Orange include C. I. Acid Orange 7, 19, and the like. Examples of the C. I. Acid Violet include C. I. Acid Violet 49, and the like. Examples of the C. I. Basic Black include C. I. Basic Black 2, and the like. Examples of the C. I. Basic Blue include C. I. Basic Blue 1, 3, 5, 7, 9, 24, 25, 26, 28, 29, and the like. Examples of the C. I. Basic Red include C. I. Basic Red 1, 2, 9, 12, 13, 14, 37, and the like. Examples of the C. I. Basic Violet include C. I. Basic Violet 7, 14, 27, and the like. Examples of the C. I. Food Black include C. I. Food Black 1, 2, and the like. These dyes are excellent in characteristics such as, vividness, water solubility, stability, and the like.

A ratio of the dye relative to the total amount of the main ink (dye ratio) is not particularly limited and is, for example, in the range of about 0.1 wt % to about 20 wt %. The dye ratio may be 20 wt % or more as long as the main ink is stable and precipitate is not generated in the main ink. One of the dyes may be used alone or two or more of them may be used in combination.

The pigment is not particularly limited. For example, carbon black, an inorganic pigment, an organic pigment, and the like may be used. Examples of the carbon black include furnace black, lamp black, acetylene black, channel black, and the like. Examples of the inorganic pigment include titanium oxide, iron oxide inorganic pigment, carbon black inorganic pigment, and the like. Examples of the organic pigment include an azo pigment such as azo lake, an insoluble azo pigment, a condensed azo pigment, a chelate azo pigment; a polycyclic pigment such as a phthalocyanine pigment, a perylene and perynone pigment, an anthraquinone pigment, a quinacridone pigment, a dioxazine pigment, a thioindigo pigment, an isoindolinone pigment, a quinophthalone pigment, and the like; a dye lake pigment such as a basic dye lake pigment, an acid dye lake pigment, and the like; a nitro pigment; a nitroso pigment; an aniline black daylight fluorescent pigment; and the like. Further, other pigments may be used as long as they are dispersible to an aqueous phase. Examples of the pigments include C. I. Pigment Black 1, 6, and 7; C. I. Pigment Yellow 1, 2, 3, 12, 13, 14, 15, 16, 17, 55, 73, 74, 75, 83, 93, 94, 95, 97, 98, 114, 128, 129, 138, 150, 151, 154, 180, 185, and 194; C. I. Pigment Orange 31 and 43; C. I. Pigment Red 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blue 1, 2, 3, 15, 15:1, 15:2, 15:3, 15:4, 16, 22, and 60; C. I. Pigment Green 7 and 36; and the like.

The pigment includes a pigment applied with surface modification such as a self-dispersed pigment. The pigment applied with the surface modification is a pigment having a surface thereof is treated with a specific functional group.

A ratio of the pigment relative to the total amount of the main ink (pigment ratio) is not particularly limited and may be decided suitably according to desired printing density, color, or the like. The pigment ratio is, for example, in the range of about 1 wt % to about 20 wt %, and in the range of about 1 wt % to about 15 wt %. One of the pigments may be used alone or two or more of them may be used in combination.

In a case where the main ink comprises the pigment, a dispersant may be added to the main ink as required. The dispersant is not particularly limited. For example, high-molecular-weight polyurethane; polyester; polymeric copolymer containing functional group showing strong affinity to a pigment of a carbonyl group or an amino group; and the like are preferable.

The main ink further may comprise water. The water may be ion-exchange water or purified water. A ratio of the water relative to the total amount of the main ink is, for example, in the range of about 10 wt % to about 90 wt %, and in the range of about 40 wt % to about 80 wt %. The ratio of the water may be a balance of the other components, for example.

The main ink further may comprise a water-soluble organic solvent. The water-soluble organic solvent is classified into a humectant and a penetrant. The humectant prevents ink from drying at a tip of an ink-jet head, for example. The penetrant adjusts a drying rate of ink on a recording medium, for example.

The humectant is not particularly limited. Examples of the humectant include lower alcohol such as methyl alcohol, ethyl alcohol, n-propyl alcohol, isopropyl alcohol, n-butyl alcohol, sec-butyl alcohol, tert-butyl alcohol, and the like; polyalcohol such as 1,3-butanediol, 1,5-pentanediol, 1,6-hexanediol, glycerin, 1,2,6-hexanetriol, 1,2,4-butanetriol, 1,2,3-butanetriol, pentanetriol, alkylene glycol, polyalkylene glycol, and the like; amide such as formamide, N-methyl formamide, N,N-dimethyl formamide, dimethylacetamide, and the like; amine such as monoethanolamine, diethanolamine, triethanolamine, monoethylamine, diethylamine, triethylamine, and the like; ketone such as acetone, and the like; ketoalcohol such as diacetone alcohol, and the like; ether such as tetrahydrofuran, dioxane, and the like; 2-pyrrolidone; N-methyl-2-pyrrolidone; N-hydroxyethyl-2-pyrrolidone; nitrogen-containing heterocyclic compound such as 1,3-dimethyl-2-imidazolidinone, ε-caprolactam, and the like; sulfur-containing compound such as dimethylsulfoxide, sulfolane, thiodiethanol, and the like; and the like. The alkylene glycol is not particularly limited and examples thereof include ethylene glycol, diethylene glycol, triethylene glycol, propylene glycol, dipropylene glycol, tripropylene glycol, butylene glycol, thiodiglycol, hexylene glycol, and the like. The polyalkylene glycol is not particularly limited and examples thereof include polyethylene glycol, polypropylene glycol, and the like. Among them, polyalcohol such as glycerin and alkylene glycol is preferable. One of the humectants may be used alone or two or more of them may be used in combination.

A ratio of the humectant relative to the total amount of the main ink (humectant ratio) is not particularly limited and is, for example, in the range of about 0 wt % to about 95 wt %, in the range of about 10 wt % to about 80 wt %, and in the range of about 10 wt % to about 50 wt %.

The penetrant is not particularly limited and examples thereof include ethylene glycol methyl ether, ethylene glycol ethyl ether, ethylene glycol propyl ether, ethylene glycol butyl ether, diethylene glycol methyl ether, diethylene glycol ethyl ether, diethylene glycol propyl ether, diethylene glycol butyl ether, diethylene glycol dimethyl ether, diethylene glycol diethyl ether, diethylene glycol dipropyl ether, diethylene glycol dibutyl ether, triethylene glycol methyl ether, triethylene glycol ethyl ether, triethylene glycol propyl ether, triethylene glycol butyl ether, triethylene glycol dimethyl ether, triethylene glycol diethyl ether, triethylene glycol dipropyl ether, triethylene glycol dibutyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol propyl ether, dipropylene glycol butyl ether, dipropylene glycol dimethyl ether, dipropylene glycol diethyl ether, dipropylene glycol dipropyl ether, dipropylene glycol dibutyl ether, tripropylene glycol methyl ether, tripropylene glycol ethyl ether, tripropylene glycol propyl ether, tripropylene glycol butyl ether, tripropylene glycol dimethyl ether, tripropylene glycol diethyl ether, tripropylene glycol dipropyl ether, tripropylene glycol dibutyl ether, and the like. One of the penetrants may be used alone or two or more of them may be used in combination.

A ratio of the penetrant relative to the total amount of the main ink (penetrant ratio) is not particularly limited and is, for example, in the range of about 0 wt % to about 20 wt %. Setting of the penetrant ratio in the aforementioned range makes it possible to obtain suitable penetration of the ink relative to a recording medium such as a recording paper. The penetrant ratio may be in the range of about 0.1 wt % to about 15 wt %, and in the range of about 1 wt % to about 10 wt %.

The main ink further may comprise a conventionally known additive as required. Examples of the additive include a surfactant, a viscosity modifier, a surface tension modifier, a pH adjuster, a mildewproofing agent, and the like. Examples of the viscosity modifier include, without limitation, polyvinyl alcohol, polyvinylpyrrolidone, water-soluble resin, and the like.

The main ink may be prepared by uniformly mixing polysaccharide and the like with other added components by a conventionally known method, and then removing insolubles with a filter, for example.

Next, the sub ink is explained. The sub ink comprises an enzyme which degrades polysaccharide and the like comprised in the main ink. The sub ink is mixed to the main ink for adjusting viscosity of the main ink as required. The enzyme is selected according to types of polysaccharide and the like comprised in the main ink. For example, in a case where polysaccharide and the like comprised in the main ink is cellulosic polysaccharide such as carboxymethylcellulose sodium, hydroxyethylcellulose, hydroxypropylcellulose, cationic cellulose, and the like, an example of the enzyme includes cellulase. Further, for example, in a case where polysaccharide and the like comprised in the main ink is amylose, amylopectin, starch, and the like, an example of the enzyme includes amylase. Moreover, for example, in a case where polysaccharide and the like comprised in the main ink is pectine and the like, an example of the enzyme includes pectinase. One of the enzyme may be used alone or two or more of them may be used in combination.

A ratio of the enzyme relative to the total amount of the sub ink (enzyme ratio) is decided suitably according to types of the enzyme, types and amount of polysaccharide and the like comprised in the main ink, desired ink viscosity after the viscosity adjustment, and the like. The enzyme ratio is, for example, in the range of about 0.01 wt % to about 10 wt %, in the range of about 0.03 wt % to about 5 wt %, and in the range of about 0.05 wt % to about 3 wt %.

The sub ink further may comprise a coloring agent. Examples and ratio of the coloring agent are similar to that of the main ink.

In a case where the sub ink comprises the pigment, a dispersant may be added to the sub ink as required. Examples of the dispersant are similar to that of the main ink.

The sub ink further may comprise water. Examples and ratio of the water are similar to that of the main ink.

The sub ink further may comprise a water-soluble organic solvent. Examples and ratio of the water-soluble organic solvent are similar to that of the main ink.

The sub ink further may comprise a conventionally known additive as required. Examples of the additive are similar to that of the main ink.

The sub ink may be prepared by uniformly mixing enzyme with other added components by a conventionally known method, and then removing insolubles with a filter, for example.

Next, the method of ink-jet recording and the ink-jet recording apparatus are explained with examples.

FIG. 1 shows a flow chart of an example of the method of ink-jet recording (FIG. 1(A)) and a schematic block diagram of an example of a structure of the ink-jet recording apparatus (FIG. 1(B)).

As shown in FIG. 1(B), the ink-jet recording apparatus 100 comprises a main ink storing portion 10, a sub ink storing portion 20, an ink adjusting tank 30, and an ink-jet head 40 as main constructional elements. In the ink-jet recording apparatus 100, the ink-jet head 40 is the ink ejecting unit. The ink adjusting tank 30 is connected to the main ink storing portion 10, the sub ink storing portion 20, and the ink-jet head 40 through flow passages, respectively. The main ink and the sub ink of the ink set for the ink-jet recording are respectively stored in the main ink storing portion 10 and the sub ink storing portion 20. The ink adjusting tank 30 may be provided with a mixer (not shown). The ink adjusting tank 30 further may be provided with measuring units for measuring viscosity and temperature of ink (not shown). The ink-jet recording apparatus 100 further comprises a temperature measuring unit 50 and two ink amount controlling units 60A and 60B as a viscosity adjusting unit. The temperature measuring unit 50 is disposed in the vicinity of the ink-jet head 40 and is connected to the two ink amount controlling units 60A and 60B. The temperature measuring unit 50 generates electronic signal information from the temperature measured therein. The two ink amount controlling units 60A and 60B comprise an ink solution sending pump (not shown) and a valve opening-closing control device (not shown). Temperature information generated in the temperature measuring unit 50 is transmitted to a central processing unit (CPU) (not shown). In the CPU, on the basis of data of an information memorizing unit (not shown), which memorizes an atmosphere temperature, an ink viscosity, and a mixture ratio of a sub ink relative to a main ink, a mixture ratio of the sub ink relative to the main ink is decided. This mixture ratio information is transmitted to the two ink amount controlling units 60A and 60B. Then, each flow rate of the main ink and the sub ink is decided by the ink amount controlling units 60A and 60B.

Recording in the method of ink-jet recording and the ink-jet recording apparatus of this example may be carried out as follows, for example.

First, as shown in FIGS. 1(A) and (B), it is judged whether a parameter relating to the main ink viscosity is out of a predetermined reference value (Step S1). In a case where the parameter relating to the main ink viscosity is not out of the predetermined reference value (No), recording is carried out using the main ink as described later. In a case where the parameter relating to the main ink viscosity is out of the predetermined reference value (Yes), the sub ink is mixed to the main ink, and the polysaccharide and the like in the main ink is degraded by enzyme in the sub ink to reduce the viscosity of the main ink (Step S1-1). For example, on the basis of the atmosphere temperature measured by the temperature measuring unit 50, it is judged whether viscosity of the main ink is, equal to, or less than a predetermined value. A method of judging the viscosity of the main ink on the basis of the atmosphere temperature may be carried out, for example, by preliminarily making a relational table of an atmosphere temperature and an ink viscosity, storing the table in the information memorizing unit, and referring the table. In a case where the viscosity of the main ink is, equal to, or less than the predetermined value, recording is carried out using the main ink as described later. In a case where the viscosity of the main ink exceeds the predetermined value, the sub ink is mixed to the main ink to degrade the polysaccharide and the like, and the viscosity of the ink is adjusted to be, equal to, or less than the predetermined value. For example, in a case where the atmosphere temperature is T1 and the viscosity of the main ink at the temperature T1 is, equal to, or less than the predetermined value, only the main ink is supplied to the ink adjusting tank 30. In contrast, in a case where the viscosity of the main ink at the temperature T1 exceeds the predetermined value, amounts of the main ink and the sub ink to be supplied to the ink adjusting tank 30 are controlled by the two ink amount controlling units 60A and 60B. Amounts of the main ink and the sub ink may be controlled by equalizing flow rates of the main ink and the sub ink and adjusting a supplying time of each ink or by equalizing the supplying time of the main ink and the sub ink and adjusting the flow rate of each ink. When the main ink and the sub ink supplied to the ink adjusting tank 30 are mixed in the ink adjusting tank 30, polysaccharide and the like comprised in the main ink are degraded by enzyme comprised in the sub ink, and the viscosity of the ink is thereby adjusted to be, equal to, or less than the predetermined value. The predetermined value of the viscosity is applicable as long as a suitable amount of the ink is ejected from the ink-jet head 40, and is decided suitably according to types of the ink-jet head 40. For example, the predetermined value is in the range of about 2 mPa·s to about 10 mPa·s. A mixture ratio of a sub ink relative to a main ink may be decided by preliminarily making a relational table of an atmosphere temperature, an ink viscosity, and a mixture ratio of the sub ink relative to the main ink, storing the table in the information memorizing unit, and referring the table.

Next, as shown in FIGS. 1(A) and (B), recording is carried out by ejecting the main ink or the ink whose viscosity is reduced, which is supplied from the ink adjusting tank 30, by the ink-jet head 40 (Step S2).

In this example, instead of the temperature measuring unit, a main ink temperature measuring unit may be provided. In such a case, instead of the relational table of the atmosphere temperature and the ink viscosity, a relational table of a main ink temperature and an ink viscosity is made.

Figure 2:
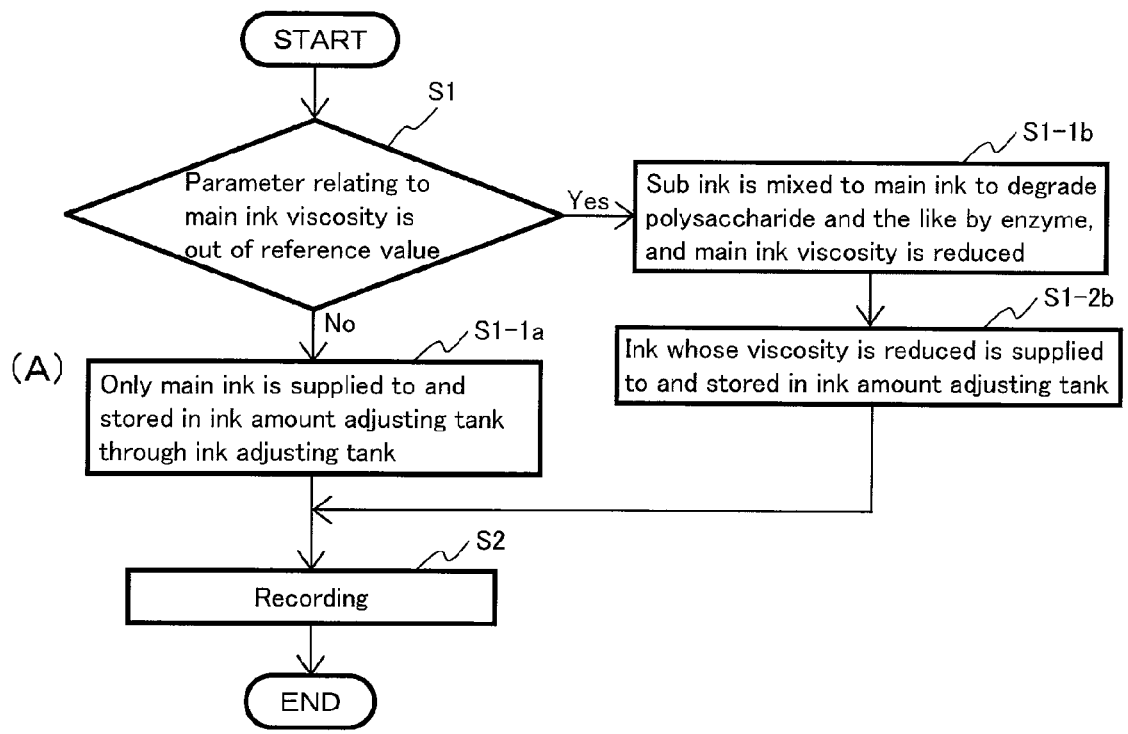
FIG. 2(A) is a flow chart of another example of the method of ink-jet recording.
FIG. 2(B) is a schematic block diagram showing another example of a structure of the ink-jet recording apparatus.
Figure 2:
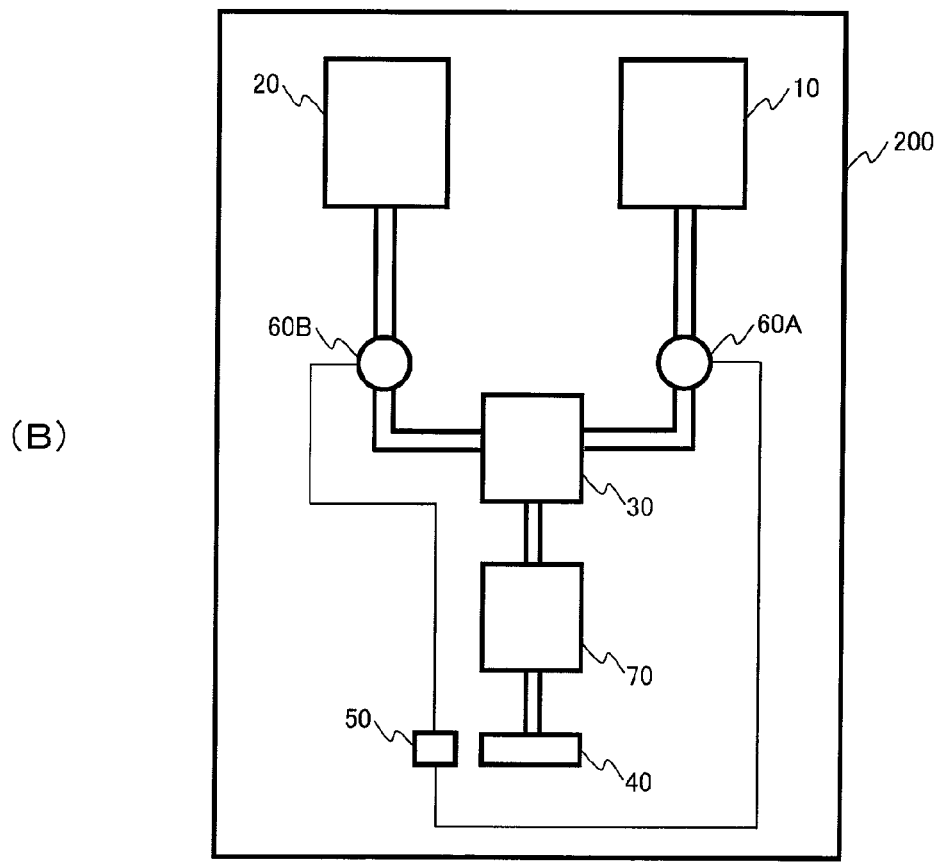

FIG. 2 shows a flow chart of another example of the method of ink-jet recording (FIG. 2(A)), and a schematic block diagram showing another example of a structure of the ink-jet recording apparatus (FIG. 2(B)). In FIG. 2, identical parts to those shown in FIG. 1 are indicated with identical numerals and symbols. As shown in FIG. 2(B), the ink-jet recording apparatus 200 has the structure similar to that of the ink-jet recording apparatus shown in FIG. 1(B) except that an ink amount adjusting tank 70 is provided between the ink adjusting tank 30 and the ink-jet head 40.

Recording in the method of ink-jet recording and the ink-jet recording apparatus of this example may be carried out as follows, for example.

First, as shown in FIGS. 2(A) and (B), it is judged whether a parameter relating to the main ink viscosity is out of a predetermined reference value (Step S1). In a case where the parameter relating to the main ink viscosity is not out of the predetermined reference value (No), only the main ink is supplied to the ink amount adjusting tank 70 through the ink adjusting tank 30, and the main ink is stored therein (Step S1-1a). In a case where the parameter relating to the main ink viscosity is out of the predetermined reference value (Yes), in the ink adjusting tank 30, the sub ink is mixed to the main ink, and the polysaccharide and the like in the main ink is degraded by enzyme in the sub ink to reduce the viscosity of the main ink (Step S1-1b). Thereafter, the ink whose viscosity is reduced is supplied to the ink amount adjusting tank 70 and is stored therein (Step S1-2b). For example, on the basis of an atmosphere temperature measured by the temperature measuring unit 50, it is judged whether a viscosity of the main ink is, equal to, or less than a predetermined value. In a case where the viscosity of the main ink is, equal to, or less than the predetermined value, only the main ink is supplied to the ink amount adjusting tank 70 through the ink adjusting tank 30, and the main ink is stored therein. In a case where the viscosity of the main ink exceeds the predetermined value, in the ink adjusting tank 30, the sub ink is mixed to the main ink to degrade the polysaccharide and the like, and the viscosity of the ink is adjusted to be, equal to, or less than the predetermined value. Thereafter, the ink whose viscosity is adjusted to be, equal to, or less then the predetermined value is supplied to the ink amount adjusting tank 70 and is stored therein.

Next, as shown in FIGS. 2(A) and (B), recording is carried out by ejecting the main ink or the ink whose viscosity is reduced, which is supplied from the ink amount adjusting tank 70 by the ink-jet head 40 (Step S2).

With respect to the ink-jet recording apparatus 200, since the ink whose viscosity is reduced is storable in the ink amount adjusting tank 70, stable recording may be carried out.

In this example, instead of the temperature measuring unit, a main ink temperature measuring unit may be provided. In such a case, instead of the relational table of the atmosphere temperature and the ink viscosity, a relational table of a main ink temperature and an ink viscosity is made.

As described above, with respect to the ink set for ink-jet recording, the ink-jet recording apparatus, and the method of inkjet recording, the main ink comprising polysaccharide and the like, and the sub ink comprising enzyme which degrades the polysaccharide and the like are used. With respect to the ink set for ink-jet recording, the ink-jet recording apparatus, and the method of ink-jet recording, in a case where the parameter relating to the main ink viscosity is out of the predetermined reference value, the sub ink is mixed to the main ink, and the polysaccharide and the like in the main ink is degraded by enzyme in the sub ink to reduce the viscosity of the main ink Therefore, with respect to the ink set for ink-jet recording, the ink-jet recording apparatus, and the method of ink-jet recording, unejection because of clogging of the nozzle due to increase in viscosity of the ink is not generated. Further, with respect to the ink set for ink-jet recording, the ink-jet recording apparatus, and the method of inkjet recording, since the sub ink which comprises enzyme is used, viscosity of the ink can efficiently be reduced by using a small amount of sub ink, for example.

EXAMPLES

Example of the present invention is described, which are provided for illustrative purposes only. The present invention is not limited by the following Example.

Example 1 and Control 1

From composition components (Table 1), components except for self dispersed carbon black were uniformly mixed to obtain an ink solvent. Next, the ink solvent was gradually added to self dispersed carbon black and then uniformly mixed. Thereafter, the obtained mixture was filtered with a cellulose acetate type membrane filter having a pore diameter of 3.00 μm manufactured by ToyoRoshi Kaisha, Ltd. to prepare a main ink comprising a polysaccharide derivative, a sub ink 1 comprising enzyme which degrades the polysaccharide derivative, and a sub ink 2 not comprising the enzyme. An ink set for ink-jet recording of Example 1 was obtained by combining the main ink and the sub ink 1. Further, an ink set for ink-jet recording of Control 1 was obtained by combining the main ink and the sub ink 2.

TABLE 1

|  | Example 1 (wt %) | | Control 1 (wt %) | |
| --- | --- | --- | --- | --- |
|  | Main ink | Sub ink 1 | Main ink | Sub ink 2 |
| Self dispersed carbon black*[1] | 33.3 (5.0)*[5] | 33.3 (5.0)*[5] | 33.3 (5.0)*[5] | 33.3 (5.0)*[5] |
| Glycerin | 21.5 | 21.5 | 21.5 | 21.5 |
| Dipropylene glycol propyl ether | 1.5 | 1.5 | 1.5 | 1.5 |
| Propylene glycol propyl ether | 1.0 | 1.0 | 1.0 | 1.0 |
| Polyoxyethylene lauryl (12,13) ether sodium sulfate (3EO)*[2] | 0.12 | 0.12 | 0.12 | 0.12 |
| Sodium carboxymethyl-cellulose*[3] | 0.10 | — | 0.10 | — |
| Cellulose-degrading enzyme*[4] | — | 0.10 | — | — |
| Purified water | balance | balance | balance | balance |

*[1] CAB-O-JET ® 300(pigment solid: 15 wt %), manufactured by Cabot Specialty Chemicals, Inc.
*[2] SUNNOL ® NL1430, manufactured by Lion Corporation
*[3] manufactured by KANTO CHEMICAL CO., INC
*[4] Cellulase A "AMANO" 3, manufactured by Amano Enzyme Inc.
*[5] pigment solid As shown in Table 2, with respect to each ink set for ink-jet recording of Example 1 and Control 1, an ink viscosity was measured after mixing the sub ink to the main ink. The method of mixing the sub ink to the main ink and the method of measuring the ink viscosity are as follows.

(Method of Mixing Sub Ink to Main Ink)

Beakers were soaked in baths of 10° C., 15° C., 20° C., 25° C., and 30° C., and then the main ink was introduced to the beakers. Then, the main ink was stirred for 30 minutes to reduce variation of temperature of the main ink in the beaker. Thereafter, the sub ink was further added to the beakers and was stirred for 1 hour.

(Method of Measuring Ink Viscosity)

Viscosity of each ink after stirring was measured using rotary B type viscometers (DV-II, manufactured by BrookField) each set at 10° C., 15° C., 20° C., 25° C., and 30° C.

TABLE 2

|  | Atmosphere temperature (° C.) | Sub ink (g)/Main ink (g) | | | | |
| --- | --- | --- | --- | --- | --- | --- |
|  |  | 0 | 0.05 | 0.15 | 0.5 | 1 |
| Example 1 (mPa · s) | 10 | 9.53 | 9.21 | — | 7.77 | 7.40 |
|  | 15 | 8.02 | 7.50 | — | 6.50 | 6.14 |
|  | 20 | 6.82 | 6.28 | — | 5.51 | 5.21 |
|  | 25 | 5.87 | 5.35 | — | 4.73 | 4.47 |
|  | 30 | 5.10 | 4.67 | — | 4.09 | 3.88 |
| Control 1 (mPa · s) | 10 | 9.53 | — | 9.05 | — | 7.87 |
|  | 15 | 8.02 | — | 7.63 | — | 6.61 |
|  | 20 | 6.82 | — | 6.52 | — | 5.60 |
|  | 25 | 5.87 | — | 5.62 | — | 4.84 |
|  | 30 | 5.10 | — | 4.88 | — | 4.21 |

Figure 3:
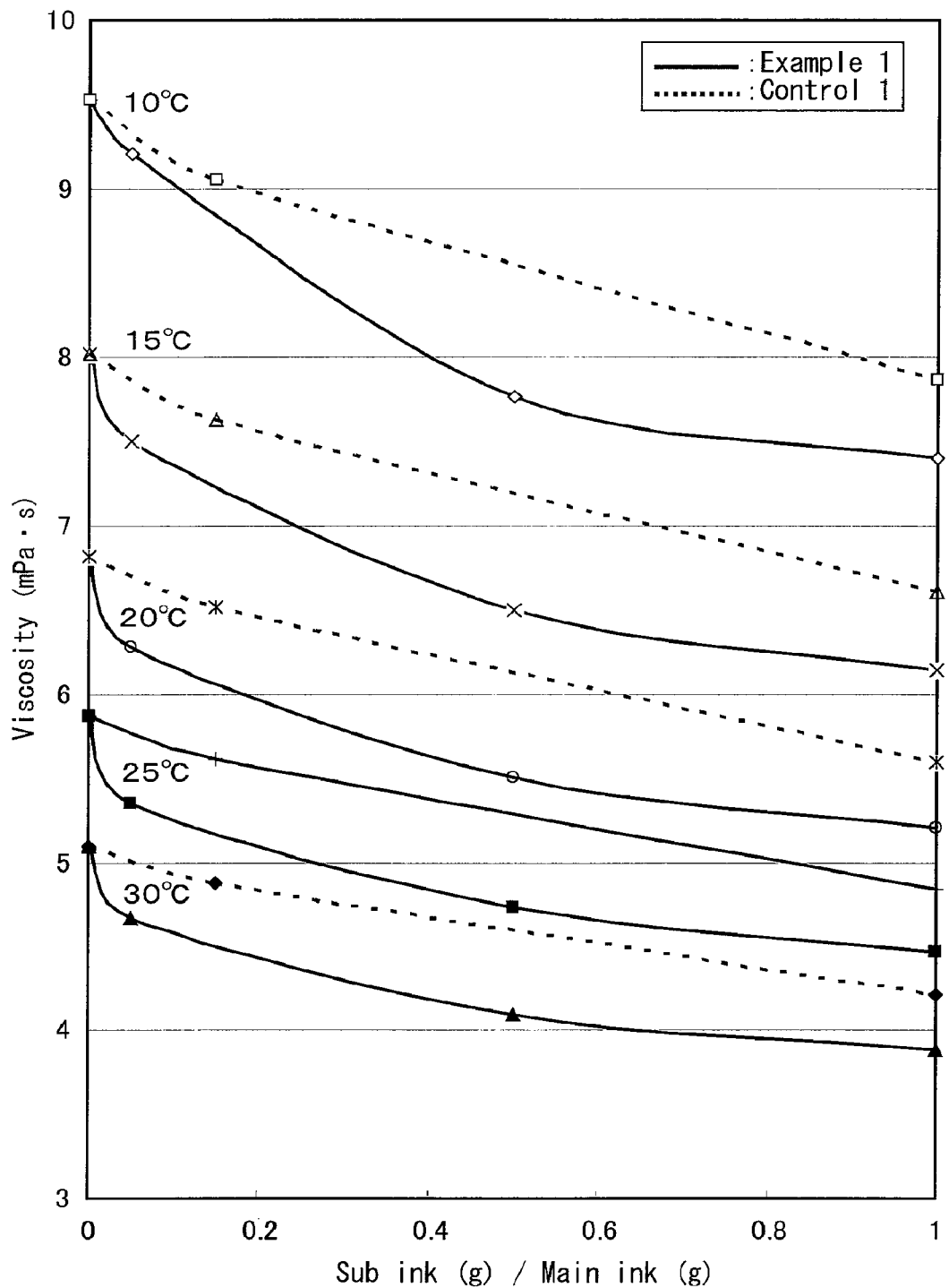
FIG. 3 is a graph showing a relationship between an ink viscosity and a ratio of a sub ink relative to a main ink in each atmosphere temperature of 10° C., 15° C., 20° C., 25° C., and 30° C. of an ink set for ink-jet recording of Example 1 and Control 1.

As shown in Table 2 and FIG. 3, in each temperature, with respect to the ink set of Example 1 having a sub ink which comprises enzyme, as compared to the ink set of Control 1 having a sub ink which does not comprise enzyme, viscosity of the ink was efficiently reduced by mixing the sub ink to the main ink. In particular, under low temperature of 10° C. and 15° C., the ink set of Example 1 could significantly reduce viscosity of the ink than the ink set of Control 1. Therefore, like Control 1, when the sub ink which does not comprise enzyme is used, a large amount of sub ink is required for reducing viscosity. In contrast, in Example of the present invention, since the sub ink which comprises enzyme is used, viscosity of the ink can efficiently be reduced by using a small amount of sub ink.

It will be obvious to those having skill in the art that many changes may be made in the above-described details of the particular aspects described herein without departing from the spirit or scope of the invention as defined in the appended claims.

What is claimed is:

1. An ink set for ink-jet recording comprising a main ink and a sub ink, wherein
    the main ink comprises at least one of a polysaccharide and a polysaccharide derivative, and
    the sub ink comprises enzyme adapted for degrading at least one of the polysaccharide and the polysaccharide derivative comprised in the main ink when the main ink and sub ink are combined;
    wherein the main ink and the sub ink each further comprise water, and a type and an amount of each component of the main ink except for the water and at least one of the polysaccharide and the polysaccharide derivative are identical to a type and an amount of each component of the sub ink except for the water and the enzyme.

2. The ink set for ink jet recording according to claim 1, wherein the main ink and the sub ink each further comprise a coloring agent, and a type and an amount of the coloring agent in the main ink are identical to a type and an amount of the coloring agent in the sub ink.

3. A full color ink set for ink jet recording comprising a yellow ink set, a magenta ink set, and a cyan ink set, which are ink sets according to claim 2, wherein
    the yellow ink set is an ink set in which a coloring agent comprised in a main ink and a sub ink comprises a yellow coloring agent;
    the magenta ink set is the ink set in which the coloring agent comprised in the main ink and the sub ink comprises a magenta coloring agent; and
    the cyan ink set is the ink set in which the coloring agent comprised in the main ink and the sub ink comprises a cyan coloring agent.

4. The full color ink set for inkjet recording according to claim 3, further comprising a black ink set, wherein the black ink set is the ink set wherein the main ink and the sub ink each further comprise water, and a type and an amount of each component of the main ink except for the water and at least one of the polysaccharide and the polysaccharide derivative are identical to a type and an amount of each component of the sub ink except for the water and the enzyme, and in the black ink set the coloring agent comprised in the main ink and the sub ink comprises a black coloring agent.

5. A method of ink jet recording performing recording on a recording medium by ejecting an ink in an ink set, wherein
    an ink set for ink jet recording according to claim 1 is used as the ink set,
    the method of ink jet recording comprises a viscosity adjusting step of a main ink before ejection of the ink, and wherein
    in the viscosity adjusting step, in a case where a parameter relating to a viscosity of the main ink is out of a predetermined reference value, a sub ink is mixed to the main ink, and at least one of a polysaccharide and a polysaccharide derivative in the main ink is degraded by enzyme in the sub ink to reduce the viscosity of the main ink.

6. The method of ink-jet recording according to claim 5, wherein in the viscosity adjusting step, the parameter relating to the viscosity in the main ink is at least one of an atmosphere temperature and a main ink temperature.

7. The method of ink-jet recording according to claim 6, wherein in the viscosity adjusting step, a mixture ratio of the sub ink to be mixed to the main ink is decided on the basis of the atmosphere temperature.

8. An ink-jet recording apparatus performing recording on a recording medium by ejecting an ink in an ink set, wherein
    the ink-jet recording apparatus comprises:
    a main ink storing portion;
    a sub ink storing portion;
    an ink adjusting tank;
    an ink ejecting unit; and
    a viscosity adjusting unit, wherein
    the ink adjusting tank is connected to the main ink storing portion, the sub ink storing portion, and the ink ejecting unit through flow passages, respectively,
    a main ink of an ink set for ink-jet recording according to claim 1 is storable in the main ink storing portion,
    a sub ink of the ink set for ink-jet recording according to claim 1 is storable in the sub ink storing portion,
    the viscosity adjusting unit is a unit for adjusting a viscosity of the main ink before ejection and comprises a temperature measuring unit and an ink amount controlling unit,
    in the viscosity adjusting unit, in a case where at least one of an atmosphere temperature and a main ink temperature measured by the temperature measuring unit is out of a predetermined reference value, the sub ink is mixed to the main ink in the ink adjusting tank by the ink amount controlling unit, and at least one of a polysaccharide and a polysaccharide derivative in the main ink is degraded by enzyme in the sub ink to reduce the viscosity of the main ink.

9. The ink-jet recording apparatus according to claim 8, wherein the ink amount controlling unit is an ink flow rate controlling unit controlling a mixture ratio of the sub ink relative to the main ink by each flow rate of the main ink and the sub ink.

10. The ink jet recording apparatus according to claim 8, further comprising an information memorizing unit, wherein ink mixture information relating to the atmosphere temperature, the main ink viscosity, and the mixture ratio of the sub ink is stored in the information memorizing unit, and wherein
    in the ink amount controlling unit, on the basis of the ink mixture information, a ratio of the sub ink to be mixed to the main ink is decided.

* * * * *

UNITED STATES PATENT AND TRADEMARK OFFICE
CERTIFICATE OF CORRECTION

PATENT NO. : 8,226,223 B2  
APPLICATION NO. : 12/365198  
DATED : July 24, 2012  
INVENTOR(S) : Kou Shimada Page 1 of 1

It is certified that error appears in the above-identified patent and that said Letters Patent is hereby corrected as shown below:

On the Title page, item 73 under Assignee:
        Please delete "Broker Kogyo Kabushiki Kaisha" and insert --Brother Kogyo Kabushiki Kaisha--

Signed and Sealed this
Ninth Day of July, 2013

Teresa Stanek Rea
*Acting Director of the United States Patent and Trademark Office*